(12) United States Patent
Viale et al.

(10) Patent No.: US 8,688,402 B2
(45) Date of Patent: Apr. 1, 2014

(54) SYSTEMS AND METHODS FOR ESTIMATING A TEMPERATURE OF A FLUID INJECTOR USED IN A HOT ENVIRONMENT

(75) Inventors: Christophe Viale, Novi, MI (US); Christian Lang, Walled Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 1220 days.

(21) Appl. No.: 12/565,529

(22) Filed: Sep. 23, 2009

(65) Prior Publication Data

US 2011/0071771 A1      Mar. 24, 2011

(51) Int. Cl.
*G01K 7/16* (2006.01)
*F02M 61/18* (2006.01)

(52) U.S. Cl.
USPC .............................. 702/133; 702/99; 123/478

(58) Field of Classification Search
USPC ..................................... 702/99, 133; 123/478
See application file for complete search history.

(56) References Cited

U.S. PATENT DOCUMENTS

| | | | |
|---|---|---|---|
| 5,179,925 A * | 1/1993 | Orminski | 123/491 |
| 5,320,077 A * | 6/1994 | Kamiya et al. | 123/339.11 |
| 5,633,458 A * | 5/1997 | Pauli et al. | 73/114.51 |
| 6,148,800 A | 11/2000 | Cari et al. | |
| 6,609,495 B1 * | 8/2003 | Cornell et al. | 123/321 |
| 6,688,533 B2 | 2/2004 | Nines et al. | |
| 6,877,486 B2 | 4/2005 | Ellies et al. | |
| 7,054,772 B2 | 5/2006 | Iannone et al. | |
| 7,263,973 B2 | 9/2007 | Akita et al. | |
| 2003/0084713 A1 * | 5/2003 | Imoehl | 73/119 A |
| 2005/0056260 A1 * | 3/2005 | Ellies et al. | 123/478 |
| 2005/0126551 A1 * | 6/2005 | Mello et al. | 123/549 |
| 2005/0216176 A1 | 9/2005 | Ichimoto et al. | |
| 2005/0273243 A1 * | 12/2005 | Kaneko et al. | 701/104 |
| 2008/0289605 A1 * | 11/2008 | Ito | 123/435 |
| 2009/0090332 A1 | 4/2009 | Brehob | |
| 2009/0216425 A1 * | 8/2009 | Hay et al. | 701/103 |

FOREIGN PATENT DOCUMENTS

| | | | | |
|---|---|---|---|---|
| DE | 10149982 | * | 4/2003 | F02D 41/06 |
| JP | 2005180343 | | 7/2005 | |
| JP | 2006063899 | | 3/2006 | |
| JP | 2006132396 | | 5/2006 | |
| JP | 2006183555 | | 7/2006 | |
| JP | 2006257917 | | 9/2006 | |
| WO | 2008/155648 | | 12/2008 | |

OTHER PUBLICATIONS

Van Roode, Mark, et al., "Comparative Evaluation of High Temperature Coatings for Corrosion Protection of Fuel Injector Tips", Surface and Coatings Technology, vol. 32, pp. 153-167, Nov. 1987.

* cited by examiner

*Primary Examiner* — Sujoy Kundu
*Assistant Examiner* — L. Anderson
(74) *Attorney, Agent, or Firm* — Michael Best & Friedrich LLP

(57) ABSTRACT

Systems and methods of estimating a fluid injector tip temperature. A controller having a processor and a memory supplies a current to a coil of a fluid injector, a resistance of the coil is measured when the current is supplied to the coil, a coil temperature is determined based on the measured resistance, and a tip temperature of a fluid injector tip is estimated based on the determined coil temperature.

13 Claims, 4 Drawing Sheets

SYSTEMS AND METHODS FOR ESTIMATING A TEMPERATURE OF A FLUID INJECTOR USED IN A HOT ENVIRONMENT

BACKGROUND

Fluid injectors, such as fuel injectors for automobiles, may be exposed to high temperatures. Exceeding a thermal limit of a tip of the injector can result in irreversible damage to the tip, which leaves the injector inoperative. Thus, it is necessary to determine a temperature of the fluid injector tip such that a cooling counter measure can be initiated when the temperature of the tip exceeds a temperature at which damage to the tip can occur.

SUMMARY

The invention relates to systems and methods for estimating a temperature of a fluid injector tip. Specifically, a resistance of a coil in the tip is used to estimate the temperature of the tip.

In one embodiment, the invention provides a method of estimating a fluid injector tip temperature. A controller having a processor and a memory supplies a current to a coil of a fluid injector, a resistance of the coil is measured when the current is supplied to the coil, a coil temperature is determined based on the measured resistance, and a tip temperature of a fluid injector tip is estimated based on the determined coil temperature.

In another embodiment, the invention provides a system for estimating a fuel injector tip temperature. The system includes a fluid injector having a coil, and a controller. The controller is configured to provide a signal to the coil to open the fluid injector, measure a resistance of the coil, and determine a temperature of a fluid injector tip based on the measured resistance of the coil Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
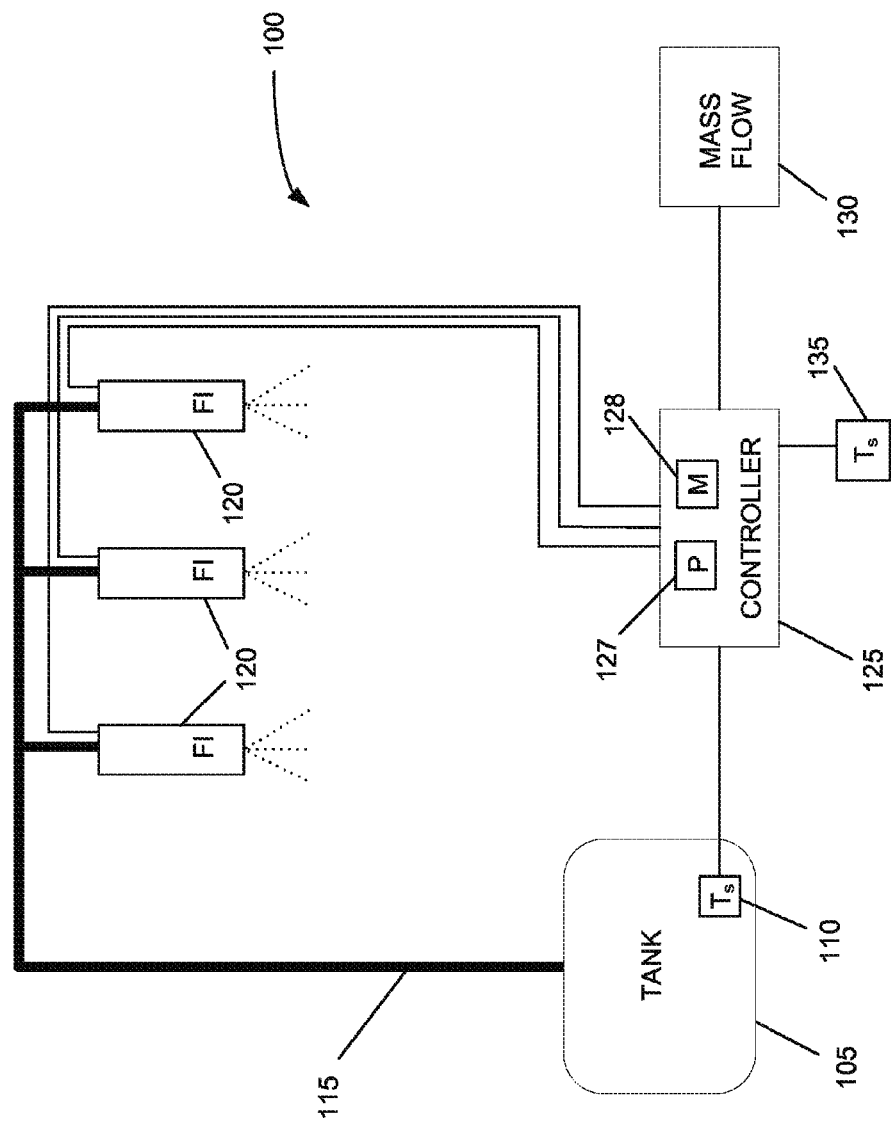
FIG. 1 is a schematic diagram of a fuel injection system incorporating an embodiment of the invention.

FIG. 1 illustrates a portion of a fuel injection system 100 for an automobile. The system 100 includes a fuel tank 105, a fuel temperature sensor 110, a fuel rail 115, a plurality of fuel injectors 120, a controller 125 having a processor 127 and a memory 128, an exhaust gas mass flow meter 130, and an exhaust gas temperature sensor 135. Fuel is provided from the fuel tank 105 to the plurality of fuel injectors 120, under pressure, via the fuel rail 115. The fuel temperature sensor 110 provides a signal indicative of the temperature of fuel in the tank 105 to the controller 125. The controller 125 also receives a signal from the exhaust gas mass flow meter 130 indicative of the flow of exhaust gases from the engine of the automobile. The exhaust gas temperature sensor 135 provides a signal to the controller 125 indicative of the temperature of exhaust gas leaving the engine. The fuel injectors 120 are individually controlled by the controller 125 to open and provide fuel to a cylinder of an engine of the automobile.

Figure 2:
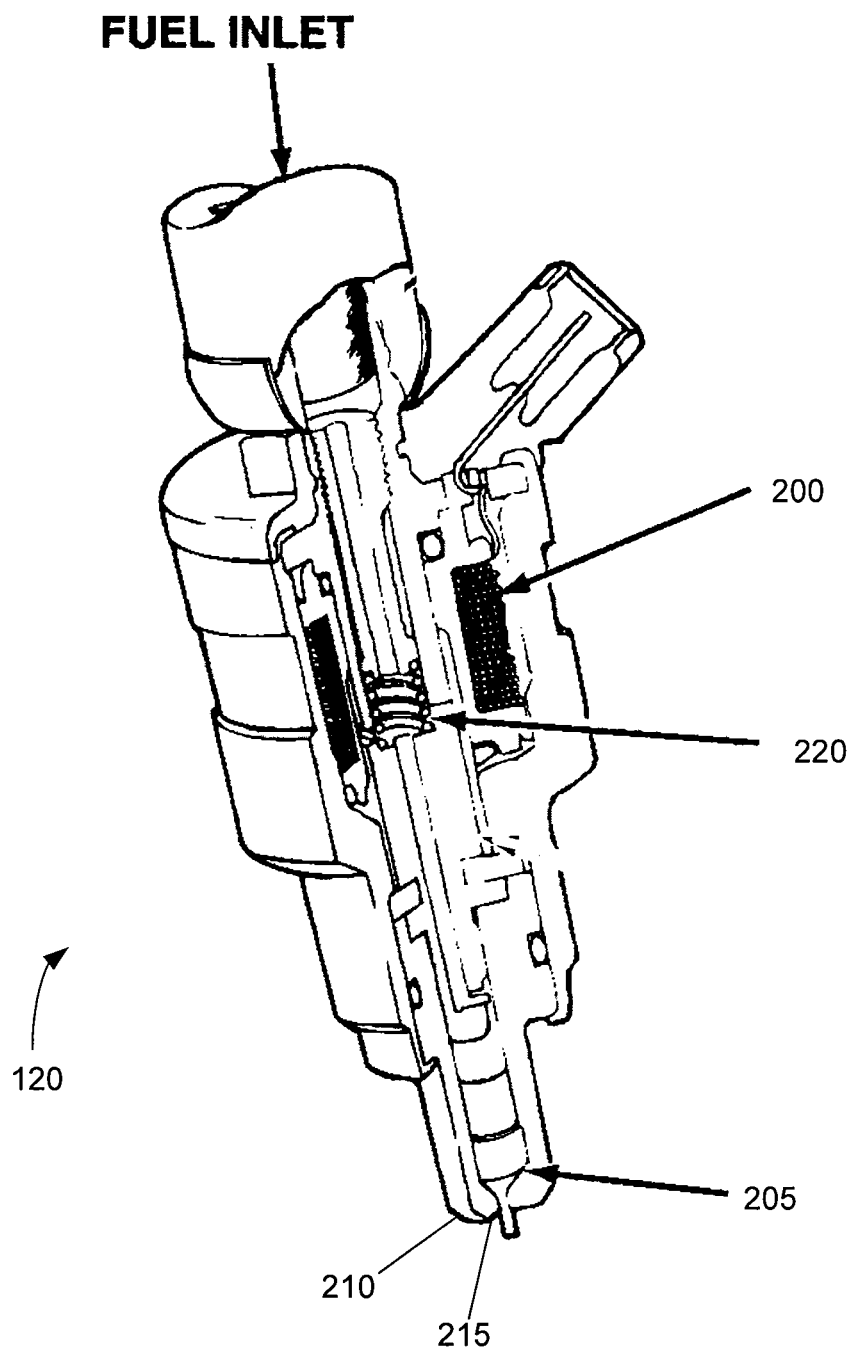
FIG. 2 is a cut-away perspective view of an exemplary fuel injector.

FIG. 2 shows an exemplary fuel injector 120. The fuel injector 120 includes a coil 200, a valve 205, and a tip 210 having an opening 215. The controller 125 provides an electrical pulse to the coil 200 of each injector 120 to open the injector 120. A pulse width (i.e., duty cycle) of the electrical pulse (i.e., the period of time the electrical pulse is provided to the coil 200), the pressure of fuel in the fuel rail 115, and the size of the opening 215 together determine the quantity of fuel injected into the cylinder. When the controller 125 provides the electrical pulse to the coil 200, the coil 200 generates a magnetic field. The magnetic field pulls the valve 205 toward the coil 200, opening the valve 205, and allowing fuel to pass through the opening 215 of the tip 210. The valve 205 is biased by a spring 220 to a closed position when the coil 200 is not energized. Systems of the invention can use fluid injectors incorporating other structures provided that the injectors include a coil or other component from which a temperature can be determined.

Figure 3:
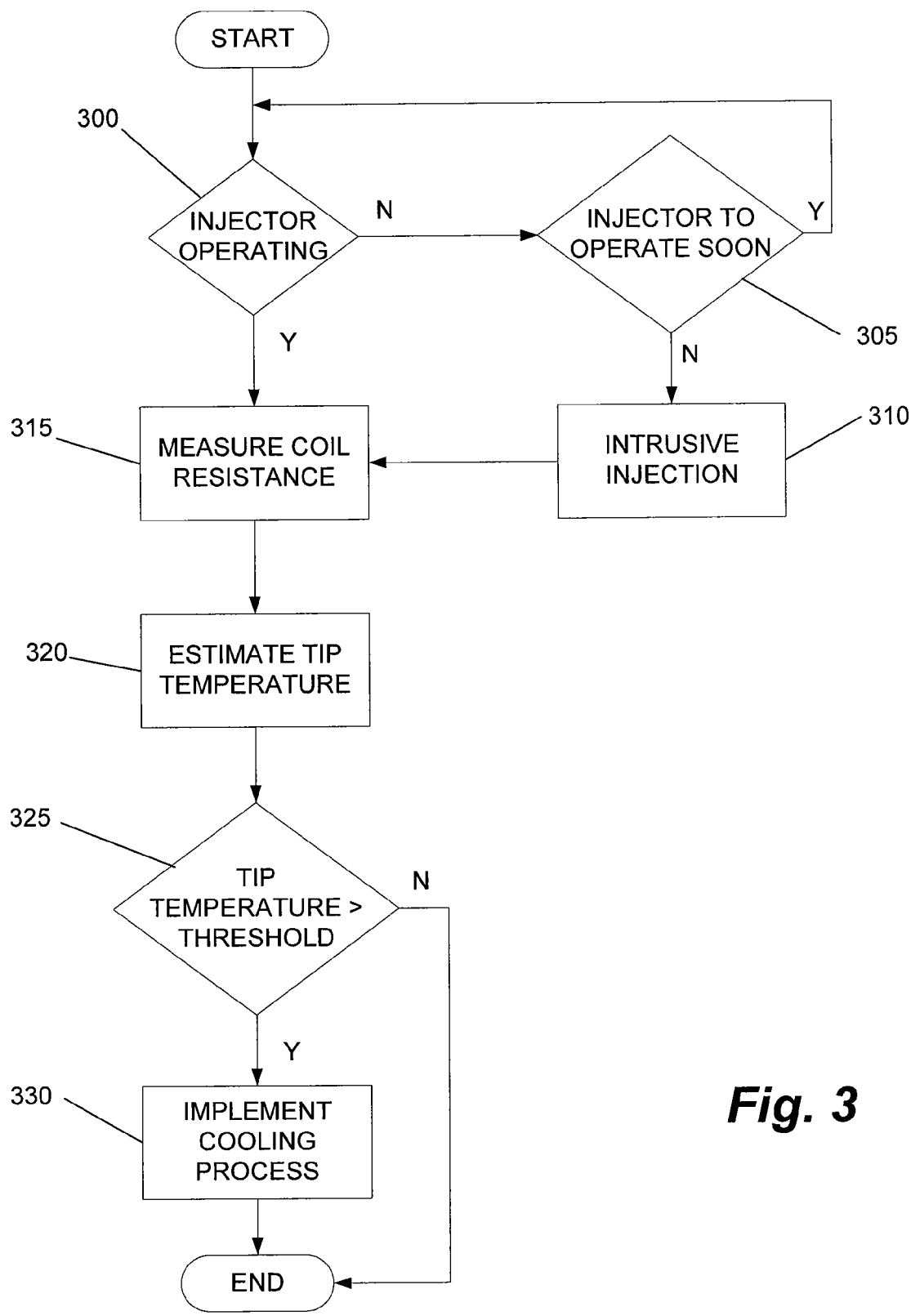
FIG. 3 is a flow chart of an embodiment of a process for maintaining a temperature of a tip of a fluid injector below a temperature at which damage to the fluid injector can occur.

FIG. 3 illustrates an operational process for maintaining the temperature of the tip 210 of an injector 120 below a predetermined temperature. The resistance of the coil 200 has a relationship to the temperature of the coil 200, and the temperature of the coil 200 has a relationship to the temperature of the tip 210 of the injector 120 (e.g., the coil 200 and the tip 210 are positioned near one another in a thermal conducting housing). The system 100 estimates the temperature of the tip 210 of a fuel injector 120 based on a measured resistance of the coil 200 of the injector 120. The resistance of the coil 200 is measured when the controller 125 applies power to the coil 200 opening the injector 120. Therefore, the controller 125 initially determines if the fuel injector 120 is operating (step 300), that is, whether power is being applied to the coil 200 of the injector 120 to release fuel through the injector 120. If power is not being applied to the coil 200 (step 300) (i.e., the injector 120 is idle), the controller 125 determines if the injector 120 will be operational within a predetermined time period (step 305). If the injector 120 will be operated within the time period, the controller 125 loops back to step 300, waiting until the injector 120 is operated. If the injector 120 is not going to be operated within the time period, the controller 125 implements an intrusive injection (step 310). The intrusive injection is an operating of the injector 120 (i.e., providing power to the coil 200) for the purpose of detecting the resistance, and thus the temperature, of the coil 200. Since the intrusive injection causes fuel to be injected into the engine cylinder at a point in time when fuel is not needed, intrusive injections are kept to a minimum. In some embodiments, the controller 125 tracks the intrusive injections and adjusts a subsequent fuel injection to compensate for the fuel previously injected into the engine cylinder by the intrusive injections.

When power is applied to the coil 200, the controller 125 determines the resistance of the coil 200 (step 315) (e.g., by measuring a current draw of the coil 200 for a given voltage). Using the resistance of the coil, the controller 125 estimates, as described in more detail below, the temperature of the tip 210 of the injector 120 (step 320). The controller 125 next checks if the estimated temperature of the tip 210 exceeds a predetermined threshold (step 325). If the tip temperature is above the threshold, the controller 125 executes a tip cooling function (step 330).

Figure 4:
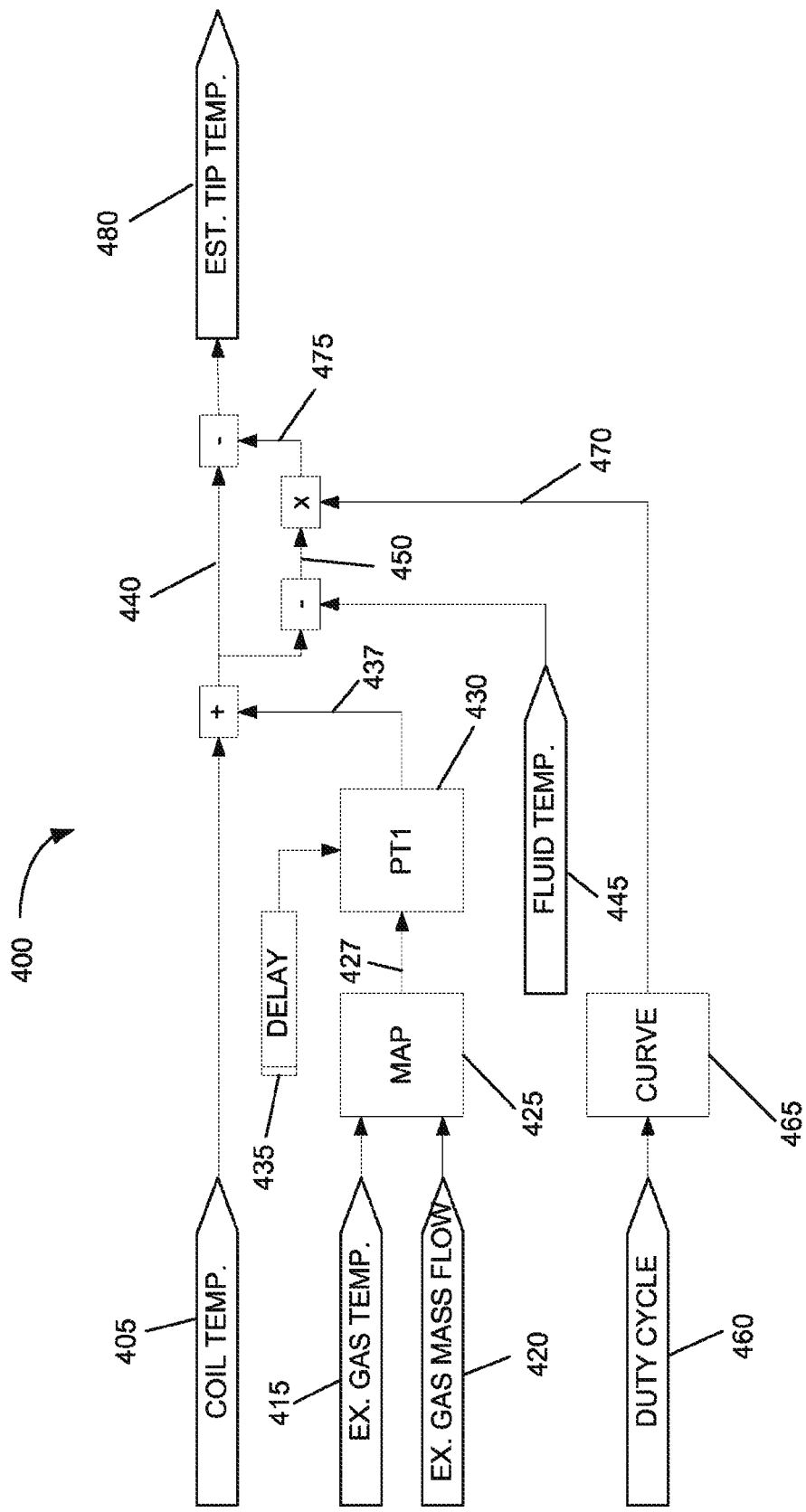
FIG. 4 is a model of an embodiment of a process for estimating a temperature of a fluid injector tip using a measured resistance of a coil of the fluid injector.

FIG. 4 is a model 400 of a process executed by the processor 127 of the controller 125 for estimating a temperature of the tip 210 of a fluid injector 120 using a temperature of the coil 200 of the injector 120. The model 400 provides higher levels of accuracy in estimating tip temperature than previous theoretical models that did not use a temperature measurement.

The controller 125 calculates the coil temperature 405 using the resistance of the coil 200. The controller 125 also receives the measured temperature 415 of exhaust gases downstream of the injector 120 from the exhaust gas temperature sensor 135, and the mass flow 420 of the exhaust gases from the exhaust gas mass flow meter 130. The controller 125 uses a three-dimensional map 425 (stored in the memory 128 during a calibration process) to determine a temperature difference between the coil 200 and the tip 210 based on the measured exhaust gas temperature 415 and mass flow rate 420. The temperature difference is an offset 427 which is filtered 430, delaying the offset 427 by a predetermined amount 435 (i.e., a delay parameter). The delayed offset 437 is added to the calculated coil temperature 405. The sum of the delayed offset 437 and the calculated coil temperature 405 is equivalent to an injector tip temperature if the injector 120 is not being used, and there is no fluid flowing through the tip 210 (i.e., a no-flow tip temperature 440).

The temperature of fuel flowing through the injector 120 impacts the temperature of the tip 215. Thus, to compensate, the controller 125 subtracts a measured temperature 445 of the fuel in a tank (i.e., fuel supplied to the injector 120 via the fuel rail 115) from the no-flow tip temperature 440 to obtain a full-flow impact factor 450. If fuel were constantly flowing through the injector 120 (e.g., full flow), the temperature of the tip 210 would need to be reduced by an amount closely related to the temperature 445 of the fuel. However, during operation, the fuel injector 120 is constantly opening and closing, providing fuel to the tip 210 at a rate less than full flow. The percentage of time that the injector 120 is open, and providing fuel to the engine, is called a duty cycle 460.

The impact the fuel temperature 445 has on the no-flow temperature 440 (the full-flow impact factor 450) is affected by, and, thus, needs to be modified by, the duty cycle 460. The controller 125 uses the duty cycle 460 and a two-dimensional curve 465 (stored in the memory 128 during a calibration process) to determine a duty cycle modification factor 470.

The duty cycle modification factor 470 is multiplied by the full-flow impact factor 450 (i.e., the difference between the no-flow tip temperature 440 and the fuel temperature 445) to generate an offset 475. The offset 475 is equivalent to the reduction in tip temperature, from the no-flow temperature 440, as a result of the cooler fuel flowing through the injector 120. The offset 475 is subtracted from the no-flow tip temperature 440 to obtain an estimated tip temperature 480. In some embodiments, the estimated tip temperature is applied to a delay filter (not shown) before being used to determine if a tip cooling operation is necessary.

Because of differences in manufacturing, and variations in the relationship between the coil resistance and temperature over time, a calibration procedure is performed periodically. In some embodiments, the calibration procedure is performed each time the injector is first used. In other embodiments, the calibration procedure is performed at predetermined intervals. The calibration procedure is performed using a temperature sensor located near the injector 120 (e.g., in an engine compartment), and is performed at a time when a relationship between the temperature sensed by the sensor (e.g., ambient air temperature) and the temperature of the coil 200 is known. For example, when an automobile engine has been turned off for an extended period, the temperatures of the engine compartment and the coil 200 are approximately equal. The controller 125 performs an intrusive injection at this time, and determines the resistance of the coil 200. The resistance of the coil is then calibrated to the temperature sensed by the sensor.

Another calibration process updates the map 425, the curve 465, and the delay parameter 435 (and any other parameters such as the optional second delay filter), storing the results of the calibration (e.g., the map 425, the curve 465, and the delay parameter 435) in the memory 128. The model of FIG. 4 allows the map 425 and the curve 465 to be calibrated in a single pass, while the delay parameter 435 requires two passes. The calibration process results in significant time and cost savings over previous methods of estimating the temperature of the fluid injector tip. In some embodiments, differences in manufacturing, and variations in the relationship between the coil resistance and temperature over time of the components of the system 100 do not vary significantly, and a calibration process is not used.

While the above description describes applications incorporating liquid fluids, it is understood that the systems and methods described are applicable in systems using gaseous fluids as well. Also, in addition to the vehicular applications described, the model and calibration process can be used in other applications such as injection molding, paint booths, food processing, diesel exhaust fluid after-treatment, etc., which employ fluid injectors having a coil, and where knowing the temperature of the tip of the fluid injector is necessary.

Thus, the invention provides, among other things, a model for estimating a temperature of a tip of a fluid injector.

What is claimed is:

1. A method of estimating a fluid injector tip temperature by a controller having a processor and a memory, the method comprising:

supplying a current to a coil of a fluid injector;

measuring by the controller a resistance of the coil when the current is supplied to the coil;

determining by the controller a coil temperature based on the measured resistance;

estimating by the controller a tip temperature of a fluid injector tip based on the determined coil temperature;

storing in the memory a three-dimensional map of exhaust gas temperatures and exhaust gas mass flows;

sensing an exhaust gas temperature;

sensing an exhaust gas mass flow;

determining a temperature increase of the fluid injector tip based on the sensed exhaust gas temperature and the sensed exhaust gas mass flow using the three-dimensional map of exhaust gas temperatures and exhaust gas mass flows;

determining a no-flow tip temperature by adding the determined coil temperature to the determined temperature increase, wherein the estimated tip temperature is based on the determined no-flow tip temperature and the determined coil temperature;

sensing a fluid temperature;

determining a full-flow tip temperature by subtracting the sensed fluid temperature from the determined no-flow tip temperature;

storing in the memory a two-dimensional curve of duty cycles of the fluid injector;
determining a duty cycle of the fluid injector;
determining a duty cycle modification factor based on the determined duty cycle and the two-dimensional curve of duty cycles of the fluid injector; and
determining an offset by multiplying the determined duty cycle modification factor by the determined full-flow tip temperature.

2. The method of claim 1, further comprising, filtering the determined temperature increase before determining the no-flow tip temperature.

3. The method of claim 1, further comprising, subtracting the determined offset from the determined no-flow tip temperature to determine the tip temperature.

4. The method of claim 1, further comprising, performing a calibration procedure to generate the three-dimensional map of exhaust gas temperatures and exhaust gas mass flows, and the two-dimensional curve of duty cycles.

5. The method of claim 1, further comprising, performing an intrusive injection if the fluid injector is idle.

6. The method of claim 1, further comprising,
sensing an ambient air temperature near the fluid injector;
determining a relationship between the measured resistance of the coil and the sensed ambient air temperature; and
storing the relationship in the memory.

7. The method of claim 6, wherein the determined coil temperature is determined using the measured resistance of the coil and the stored relationship.

8. A system for estimating a fluid injector tip temperature, the system comprising:
a fluid injector having a coil; and
a controller configured to
provide a signal to the coil to open the fluid injector,
measure a resistance of the coil,
determine a coil temperature based on the measured resistance;
determine a temperature of a fluid injector tip based on the measured resistance of the coil,
store in a memory a three-dimensional map of exhaust gas temperatures and exhaust gas mass flows;
sense an exhaust gas temperature;
sense an exhaust gas mass flow;
determine a temperature increase of the fluid injector tip based on the sensed exhaust gas temperature and the sensed exhaust gas mass flow using the three-dimensional map of exhaust gas temperatures and exhaust gas mass flows;
determine a no-flow tip temperature by adding the determined coil temperature to the determined temperature increase,
wherein the estimated tip temperature is based on the determined no-flow tip temperature and the determined coil temperature;
sense a fluid temperature;
determine a full-flow tip temperature by subtracting the sensed fluid temperature from the determined no-flow tip temperature;
store in the memory a two-dimensional curve of duty cycles of the fluid injector;
determine a duty cycle of the fluid injector;
determine a duty cycle modification factor based on the determined duty cycle and the two-dimensional curve of duty cycles of the fluid injector; and
determine an offset by multiplying the determined duty cycle modification factor by the determined full-flow tip temperature.

9. The system of claim 8, further comprising a fluid tank temperature sensor configured to sense a fluid temperature in a fluid tank and provide a first signal to the controller indicative of the fluid temperature, wherein the controller uses the first signal to determine the temperature of the fluid injector tip.

10. The system of claim 8, further comprising,
a mass flow meter configured to sense a mass flow of exhaust from a cylinder associated with the fluid injector and to provide a first signal to the controller indicative of the mass flow of exhaust gases; and
an exhaust temperature sensor configured to sense an exhaust gas temperature associated with the fluid injector and to provide a second signal to the controller indicative of the exhaust gas temperature,
wherein the controller determines the temperature of the fluid injector tip using the measured resistance of the coil and the first and second signals.

11. The system of claim 10, wherein the controller is configured to determine a no-flow tip temperature by adding a coil temperature determined using the measured resistance of the coil to a temperature increase of the fluid injector tip determined using the sensed exhaust gas temperature and the sensed exhaust gas mass flow.

12. The system of claim 8, further comprising a temperature sensor positioned near the fluid injector and providing a signal indicative of an ambient air temperature to the controller.

13. The system of claim 12, wherein the controller uses the signal indicative of the ambient air temperature during a calibration process to determine a relationship between the measured resistance of the coil and a coil temperature.

* * * * *